Dec. 21, 1937.   J. H. KORTERING   2,102,722
TRACTOR HITCH DEVICE
Filed Feb. 26, 1936   5 Sheets-Sheet 1

INVENTOR.
Justin H. Kortering
BY
Chappell, Earl & Chappell
ATTORNEYS

Dec. 21, 1937.   J. H. KORTERING   2,102,722
TRACTOR HITCH DEVICE
Filed Feb. 26, 1936   5 Sheets-Sheet 2

INVENTOR.
Justin H. Kortering
BY
Chappell, Earl & Chappell
ATTORNEYS

Dec. 21, 1937.  J. H. KORTERING  2,102,722
TRACTOR HITCH DEVICE
Filed Feb. 26, 1936   5 Sheets-Sheet 3

INVENTOR.
Justin H. Kortering
BY
Chappell, Earl Chappell
ATTORNEYS

Patented Dec. 21, 1937

2,102,722

UNITED STATES PATENT OFFICE 2,102,722

TRACTOR HITCH DEVICE

Justin H. Kortering, Holland, Mich.

Application February 26, 1936, Serial No. 65,770

22 Claims. (Cl. 180—14.5)

This invention relates to improvements in tractor hitch devices.

The main objects of this invention are:

First, to provide a hitch device for connecting a tractor with an implement to be drawn thereby, such as a plow, cultivator, or other farm tool, to protect the implement against damage in case it strikes a rock, stump or other obstruction.

Second, to provide a device of the type described, characterized by a resilient draft action, which device is automatically disconnected when an obstruction is encountered by the implement being drawn and further characterized by the fact that yielding braking or shock absorbing action is set up or provided after said disconnection.

Third, to provide a device of the type described embodying automatically operative tractor clutch release mechanism.

Fourth, to provide a device of the type described, which may be readily operated and is free from objectionable and dangerous features heretofore found in devices of this nature.

Fifth, to provide a device embodying automatically actuated release means for the clutch of a tractor and re-engaging means therefor in combination with a tractor hitch.

Sixth, to provide a device of the type described, characterized by a hydraulic shock absorbing structure.

Seventh, to provide a device of the type described, which is simple in construction and economical in its parts.

Objects relating to details and economies of the invention will appear from the description to follow. The invention is defined in the claims.

Preferred embodiments of the invention are illustrated in the accompanying drawings, in which.

Modern tractors for agricultural purposes and the like have been developed to provide considerable speed of operation as well as power. It has been found that such high speed tractors render previously known safety stop devices for hitching implements to the tractors by a yieldable connection almost useless, due to the fact that it has been found impossible to stop the motion of the tractor in a sufficiently short space of time after the implement has encountered a rock, stump or other obstruction. Devices have been proposed wherein the additional resistance presented by a heavy body causes the tractor hitching element to yield without completely separating. However, the tractor is still moving under full power, and if the operator is not exceedingly vigilant damage will result to the implement.

Further, in re-engaging the hitch device of the prior art, wherein the hitch separates into two parts, after separation thereof it has been necessary to manually connect the parts thereof, which is objectionable and often very dangerous. Automatic hitches have been designed wherein the parts of the hitch remain together, yet these hitches are also objectionable in view of the fact that when an obstruction is encountered and the hitch automatically disengages, the tractor tends to gain speed, with the result that the implement drawn may be pulled against the obstruction under the full power of the tractor and thereby damaged.

By the construction of my invention, I have provided a tractor hitch which overcomes the difficulties noted above. The load is normally borne by a draft spring, being transmitted through a connection which is automatically broken when a predetermined load resistance is encountered. I have provided hydraulic dashpot means which comes into play when the connection is broken and cushions or brakes the separating movement between the tractor and implement. I have further provided automatic means actuated by the separating movement mentioned to release the tractor clutch, whereby the tractor comes to rest under the influence of the braking and shock absorbing action, and my device still further embodies means whereby the tractor and implement may be brought together after the partial separation thereof, which means is controlled by the operator without the necessity of his dismounting from the tractor.

In the drawings, reference numeral 1 indicates the draw bar of a tractor or other similar clutch controlled draft device, and the reference numeral 2 indicates the tongue of a plow, cultivator, harrow, or other agricultural implement. I have shown and described my invention in connection with a tractor and agricultural implement, wherein my invention preferably finds appreciation. However, it is to be understood that my invention is not limited to this field and is susceptible of being used in a large number of connections in which a resilient coupling and an automatically operable clutch release is desirable.

Reference numeral 3 broadly indicates the device of my invention, which consists of a forked coupling member 4 pivotally connected to the draw bar 1 by a pin 5. Connected to the coupling member is an elongated draft rod 6 having at the free end thereof a dashpot plunger 7 provided with a cup packing leather 8 and a retaining plate 9, which members are secured together by a nut 10 threaded on the end of the shaft 6. I provide a valve opening 11 in the plunger and retaining plate and pivotally mount a check valve 12 on the plunger adjacent the opening to cooperate therewith. The check valve is faced with leather or other suitable facing material 13. I provide a small vent or port 14 opening through the valve for a purpose which will be hereinafter described. The plunger 7 slides in a dashpot cylinder 15 which is provided with a manually operated air cock 16 and a threaded drain plug 160, and the cylinder is filled with fluid such as a light oil.

Adjacent the cylinder 15 and concentric therewith to surround the shaft 6, I provide a hitch member comprising a tubular housing 17, the ends of which are closed by front and intermediate crossheads 18, 19, respectively, the crosshead 19 likewise constituting a closure or head for the cylinder 15. The cylinder 15 is sealed at the end opposite the head 19 by the rear crosshead 20, and suitable packing material 200 is placed between the cylinder and crossheads 19 and 20 to seal the cylinder. Tie rods 21 connect the crossheads 18 and 20 and extend through the crosshead 19, whereby the packing material is compressed and cylinder 15 and housing 17 are rigidly secured together in unitary form. The crossheads 18 and 19 are slidable on the rod 6 and the crosshead 20 is provided with a coupling member comprising a forked extension 61 which is pivoted to the implement tongue 2 by a pin 62.

The crosshead 18 is drilled and threaded in a direction parallel to the rod 6 to receive the screws 22 which adjustably engage a support member 23 and restrain it against axial movement. The draft rod passes through the center of the support member. The crosshead 19 is provided with a recess containing suitable stuffing material 24 and a packing gland or bushing 25 is secured to the crosshead by screws 26 whereby a fluid-tight seal is provided to prevent fluid entering the housing 17. The housing is packed with suitable lubricating grease.

Figure 6:
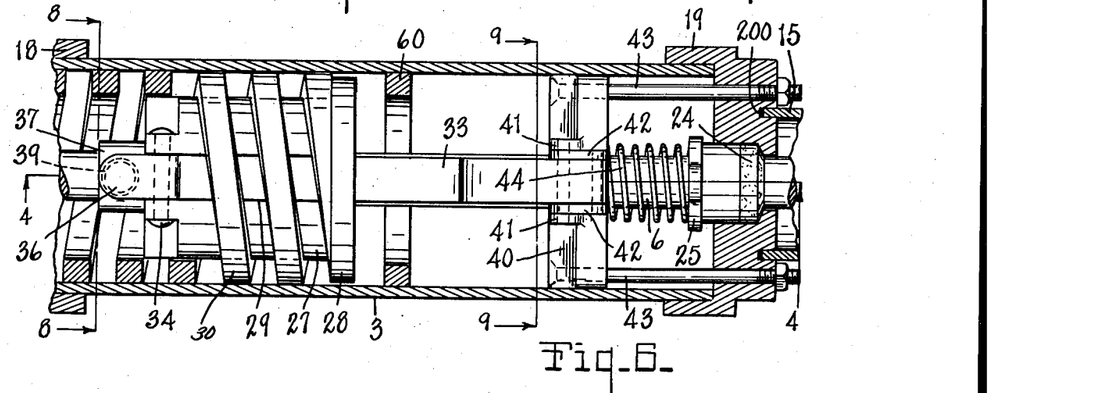
Fig. 6 is a fragmentary view partially in section further illustrating the parts of the invention.
Figure 7:
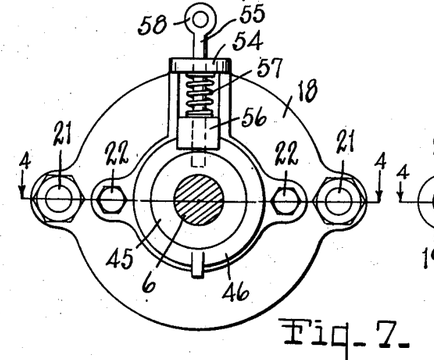
Fig. 7 is a transverse section on line 7—7 of Figs. 1 and 4.
Figure 8:
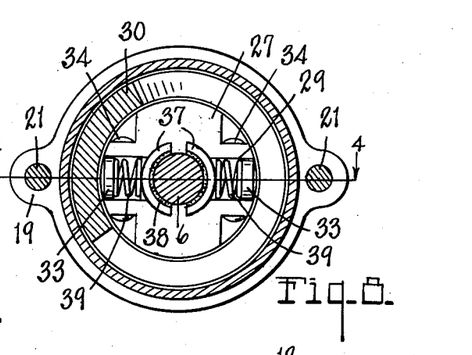
Fig. 8 is a transverse section on line 8—8 of Figs. 1, 4 and 6.
Figure 9:
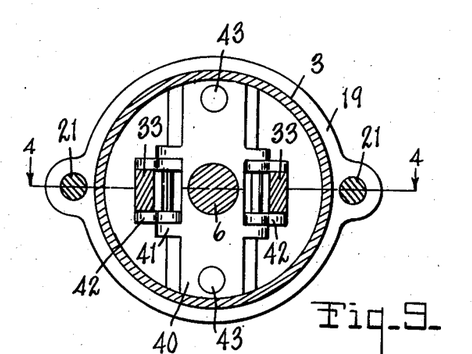
Fig. 9 is a transverse section on line 9—9 of Figs. 1, 4 and 6.

Inside the housing 17, I dispose a yoke or sleeve 27 for longitudinal movement therein, the yoke being provided with an annular thrust collar 28 and a slot 29 extending the length of the sleeve, but not intersecting the collar, as illustrated in Fig. 6. A coiled compression draft spring 30 is interposed between the collar 28 and the support member 23.

Figure 4:
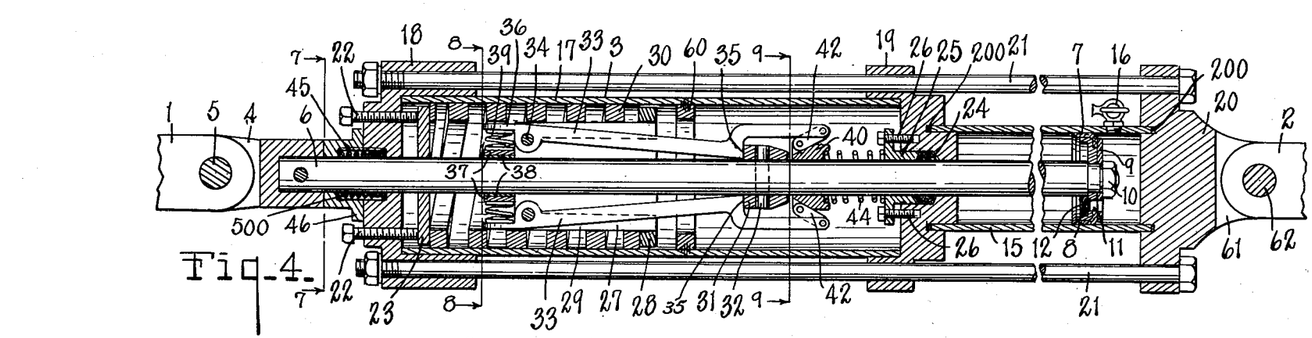
Fig. 4 is a view mainly in central longitudinal section taken on the line 4—4 of Figs. 6, 7, 8 and 9, the parts being shown in engaged position.

The draft rod 6 carries within the housing 17 a ring or annular lug 31 which is fixedly secured to the shaft by a pin 32 extending through the lug and shaft. The lug 31 constitutes the driving element, whereby power is transmitted from the shaft 6 through the spring 30 and tie rods 21 to the implement being drawn by the tractor. In order to accomplish this line of power transmission, I pivotally mount a pair of pawls 33 on the sleeve 27 at 34, the pawls extending rearwardly toward the lug 31 and each being provided with an inwardly jutting lug engaging jaw 35 which in operative or power transmitting relation of the parts engages the lug, as illustrated in Fig. 4. Pawls 33 are provided adjacent the pivot point with flat tails 36, and radially disposed inwardly thereof with respect to the draft rod 6 I mount a pair of friction brake members or shoes 37 provided with appropriate friction facing material 38. Coil compression springs 39 are interposed between the tails 36 and shoes 38 and act radially to actuate the brake members whereby the rod 6 is frictionally gripped, as well as to resiliently urge the pawls 33 into engaged or driving relation with the lug 31.

I provide means for disengaging the jaws 35 from the driving lug 31, consisting of a collar 40 slidably mounted on the rod at the rear of the draft lug 31 and having ears 41 to which are pivoted at one end toggle links 42. The opposite ends of the links 42 are pivoted to the free swinging ends of the pawls 33. The collar 40 has secured thereto a stop rod 43 which passes through the intermediate crosshead 19 and limits the longitudinal movement of the collar toward the left as viewed in Figs. 4 and 5. The collar is urged forwardly or towards the left by a coil spring 44 interposed between the collar and the gland 25. By the above construction, it will be seen that when a rock, stone, stump or other obstruction is encountered by the implement, the latter will tend to stop, whereupon the lug 31 moves towards the left as viewed in Fig. 4, compressing the spring 30 through the force transmitting agency of the pawls 33. The resulting movement of the levers tends to straighten the toggle links 42 to the position shown in Fig. 5, inasmuch as the collar 40 is restrained from movement by the rod 43. The result is that the jaws 35 are lifted from engagement with the lug 31.

Figures 5, 10:
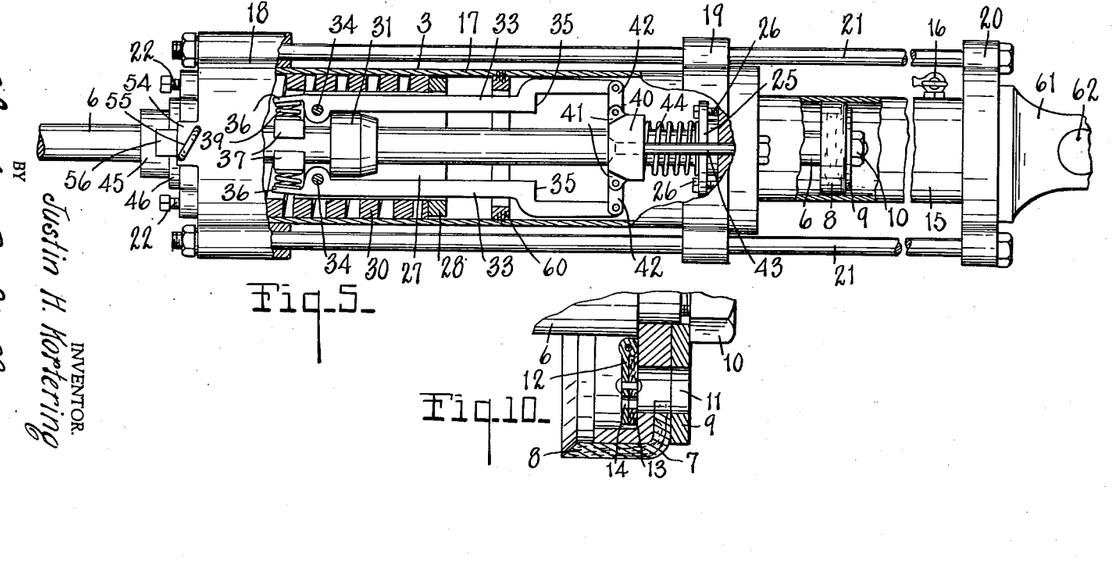
Fig. 5 is a similar view partially broken away and partially in longitudinal section, illustrating the position of the parts in disengaged or clutch releasing position.
Fig. 10 is an enlarged fragmentary view illustrating details of the valve mechanism of the shock absorbing dashpot.

Upon the disengagement of the jaws and the lug, the rod 6 is free to move to the left as viewed in Fig. 5, into the position illustrated in that figure, the movement of the rod being resisted or braked and cushioned by the plunger 8 in the cylinder 15. It is clear that fluid will travel at a slow rate through the port or vent 14 from the left side of the plunger to the right. This cushioned movement of the rod 6 prevents the tractor from injuring the stationary drawn implement. It will likewise be clear that movement of the plunger in the opposite direction or to the right as viewed in Figs. 4 and 5 will not be materially resisted due to the fact that the valve opening 13 is sufficiently large to permit ready flow of fluid therethrough.

Figure 1:
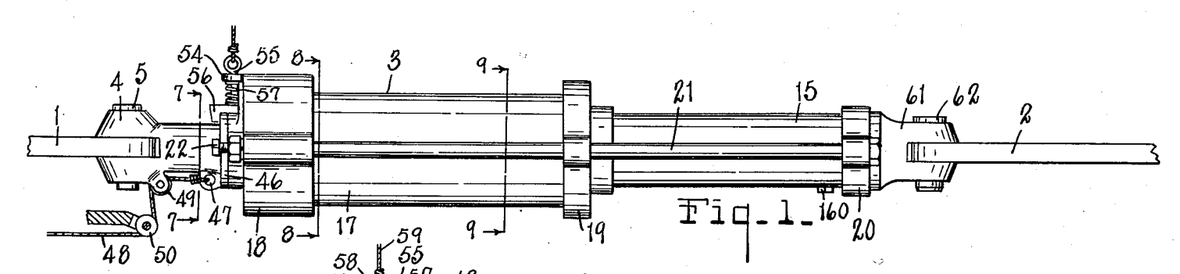
Fig. 1 is a view in side elevation of the device of the invention illustrated in operative relation to the draw bar of the tractor and the tongue of an implement being drawn.
Figure 2:
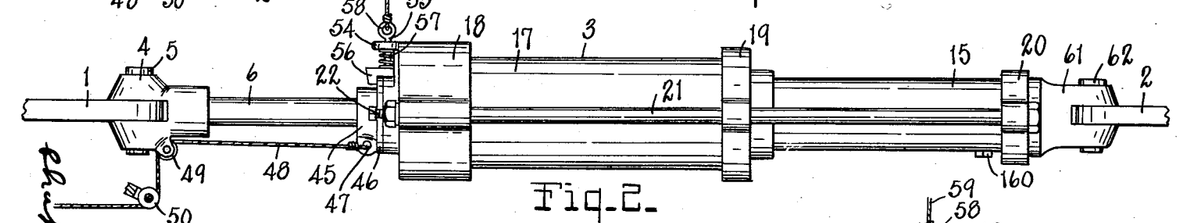
Fig. 2 is a view similar to Fig. 1, illustrating the device in clutch releasing or disengaged position.
Figure 3:
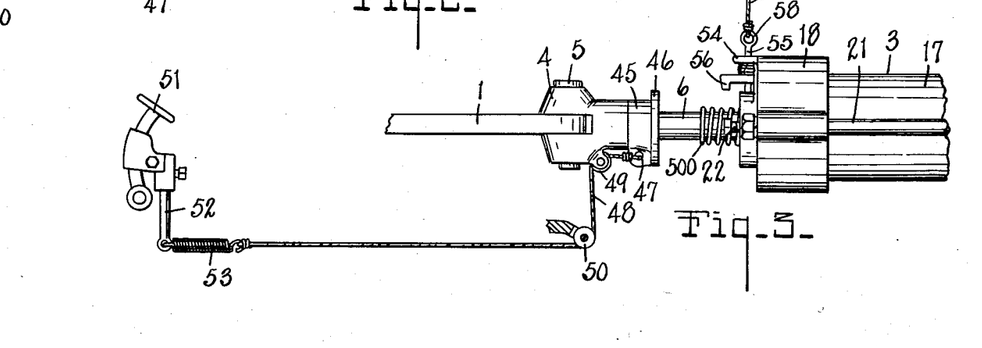
Fig. 3 is a fragmentary view in side elevation illustrating the relation of the parts of my device with respect to a tractor draw bar and clutch, the clutch releasing mechanism being shown in operative position whereby the tractor clutch is reengaged.

My invention comprises means whereby the tractor may be automatically declutched, or the clutch released, upon the disengagement of the jaws 35 and the lug 31. Such means comprises a rider 45 which is loosely mounted for sliding movement on the rod 6 exteriorly of the crosshead 18. The rider 45 is provided with a flange 46 and an eye 47 through which a cable 48 is secured, the cable 48 passing over a grooved roller 49 rotatably mounted on the coupling member 4 and around a further roller 50 mounted in suitable position on the tractor. As illustrated in Fig. 3, the cable 48 is operatively associated with the clutch pedal 51 of the tractor through an actuating lever 52 and a coil spring 53 interposed between the cable and the lever. The crosshead 18 is provided with an ear 54 which is drilled to slidably carry a pin 55 having a hook detent 56 on the end thereof, the detent being adapted to hook over the flange 46 of the rider and lock the same against the crosshead 18. A coil spring 57 is interposed between the detent and extension 54 to urge the detent toward locking position. The pin 55 has an eye 58 thereon to which is secured a control cable 59 and the cable is led to a convenient position on the tractor for manipulation by the operator. A coiled compression spring 500 encircling rod 6 between rider 45 and crosshead 18 urges the rider to open position when the rider is released by actuation of control cable 59.

By the above construction, assuming that the implement has encountered a rock or snag, it will be seen that separating movement of the tractor and the bolted crosshead 18 of the housing 17 results in actuation of the cable 48 to release the clutch of the tractor, thereby bringing the same to rest. Upward actuation of the cable 59 and detent 56 allows the rider to slide toward the tractor, thus enabling the clutch to re-engage when it is desired to operate the tractor in reverse to bring the parts of the hitch into driving position.

Rider 45, in combination with cable 48, rollers 49, 50, and detent 56, provides a simple yet highly efficient means for releasing the clutch and re-engaging the clutch after the tractor and implement have come to a halt. The rider is readily restored to its original position against crosshead 18 by simply backing the tractor until spring 500 is compressed and the rider rests against the crosshead. Control cable 59 is then actuated to hook the detent 56 about the rider, after which the device is completely restored. It is desired to stress likewise the importance of tension spring 53 which is interposed between the clutch actuating lever 52 and the cable. The spring is of sufficient tension to throw the clutch out of engagement under the influence of a separating movement of the parts, and when the clutch has traveled to its maximum extent, spring 53 flexes. The spring serves the purposes of preventing breakage of the cable or clutch parts and making it possible to disengage the clutch almost immediately after the hitch has released upon encountering an obstruction. Thus, the full benefit of the braking effect caused by the dashpot resistance is received, the clutch being released and the power off so that only the momentum of the tractor need be combatted. The spring stretches throughout the distance that the travel of rod 6 will allow.

The cable 59 is employed to restore the parts to their normal driving relationship, the positioning of the cable in a convenient place adjacent the operator enabling the rider 45 to be again secured against the crosshead 18 when the tractor is driven in reverse without the necessity of the operator dismounting.

In order to maintain the yoke 27 in its position adjacent the left-hand end of the housing 17, as viewed in Figs. 4 and 5, and to prevent the same from interfering with the action of the pawls 33, I spot weld an annular stop 60 onto the housing interiorly of the same, the stop being at the rear of and normally out of engagement with the yoke thrust collar 28. The restraining member or stop thus provided limits the maximum return of the yoke under the driving force imparted to it by the draft spring 30 when the spring is freed from compression.

It has been found desirable to utilize a round element or rod for the rod 6 inasmuch as this permits the swiveling of the housing 17 with respect to the rod, so that regardless of the position of the drawn implement the hitch will be effective. The annular lug 31 permits swiveling movement of the assembly about the rod 6 by engaging jaws 35 in any position of the jaws with respect to the rod. The adjusting screws 22 furnish a simple means for varying the degree of compression of the spring 30.

Figure 11:
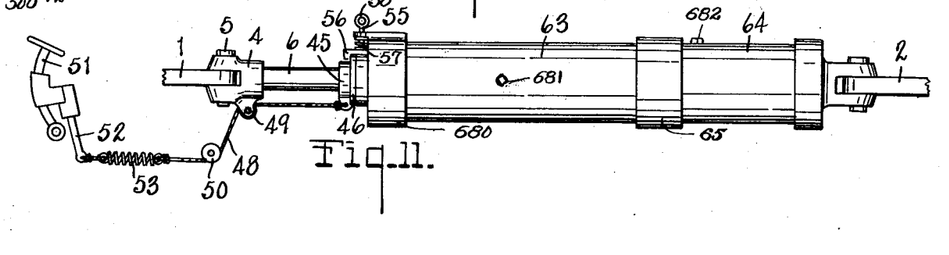
Fig. 11 is a side elevational view of a modified form of the invention.
Figure 12:
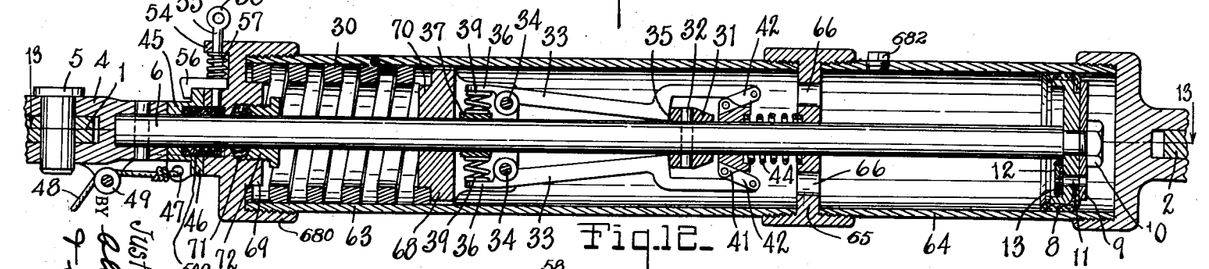
Fig. 12 is a sectional view taken on line 12—12 of Fig. 13.
Figure 13:
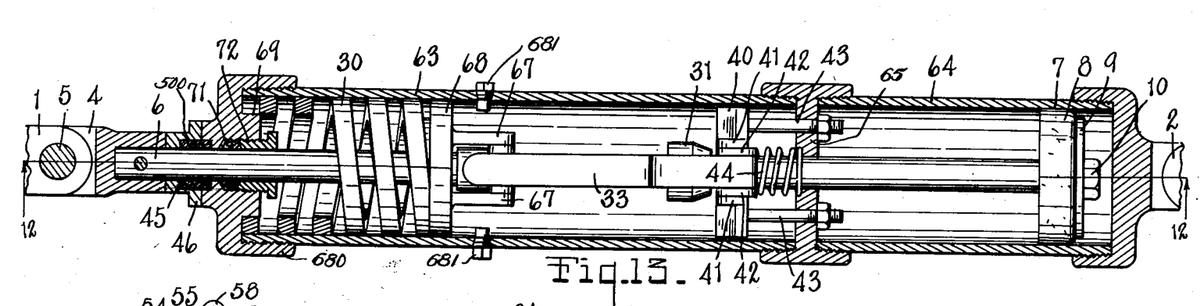
Fig. 13 is a sectional view taken on line 13—13 of Fig. 12.

In the embodiment of my invention illustrated in Figs. 11, 12 and 13, I employ a housing 63 extending substantially the entire length of the hitch device, the dashpot cylinder 64 being merely an extension of the housing. The crosshead 65 is provided with holes 66 of substantial dimension and the entire housing is filled with a fluid similar to the fluid employed in the cylinder 15 of the embodiment of Figs. 1 to 10. I pivot pawls 33 between a pair of brackets 67 formed on one side of a thrust disk 68 which forms a bearing surface for one end of the coil spring 30. The other end of the coil spring abuts the crosshead 680. The spring is alined and restrained at either end by raised plugs 69, 70 formed integral with the crosshead and disk respectively. Stops 681 are threaded into housing 63 to limit the movement of draft spring 30 to the right as viewed in Fig. 13, and cleaning and filling plugs 682 are provided to enable filling and removal of the fluid in cylinder 15.

For the purpose of sealing the housing in the embodiment being described, I provide packing material 71 adjustably compressed by the gland 72 threaded in a recess in the crosshead 680. In other respects, the embodiment of Figs. 11, 12 and 13 is similar to that shown and described in connection with Figs. 1 to 10, and the manner of operation is the same. The embodiment of Figs. 11, 12 and 13 permits the braking fluid to operate also as a lubricating means for the other operating parts of the device.

Figure 14:
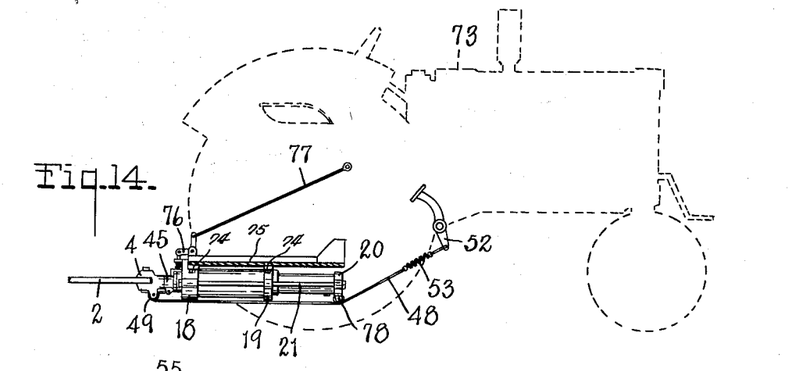
Fig. 14 is an elevational view partially broken away and in section, illustrating a further manner of mounting my improved hitch.
Figure 15:
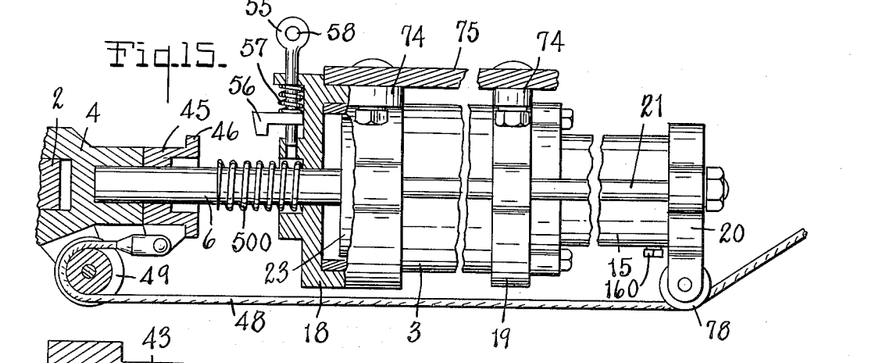
Fig. 15 is a fragmentary sectional view illustrating details of construction when the above mounting is employed.
Figure 16:
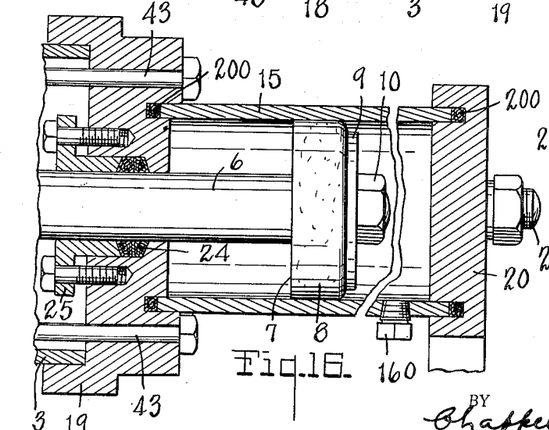
Fig. 16 is an enlarged fragmentary view in section on the line 16—16 of Fig. 17.
Figure 17:
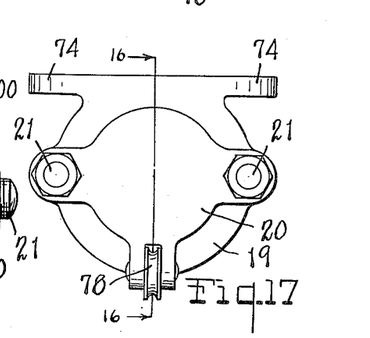
Fig. 17 is an end view illustrating details enabling my hitch to be mounted in the manner illustrated in Fig. 14.

In Fig. 14, I illustrate a modified manner of mounting my hitch construction with reference to a tractor shown in dotted lines and indicated by the reference numeral 73. In this arrangement, the parts 4 and 61 are reversed, the tongue or draw bar 2 of the implement being pivoted to coupling member 4. Crossheads 18, 19 are provided with laterally extending flanges or ears 74 by means of which the hitch is secured to a flat draw bar 75 on the tractor in any suitable manner. A bell crank 76 is pivoted in a convenient position and the arms thereof engage respectively pin 55 and a link 77 which extends to a position adjacent the operator's seat for ready manipulation by the operator. Cable 48 in the modification being described extends around roller 49 and around a further roller 78 journaled between a pair of ears formed on crosshead 20, thence upwardly to tension spring 53 and clutch actuating lever 2.

The foregoing embodiment enables my tractor hitch to be installed beneath the tractor, whereby space is considerably conserved. Alternatively, the hitch may be installed behind the tractor, as illustrated in Figs. 1 to 13. The manner of installation is optional, depending either on the type of equipment used in connection with the hitch or on other considerations. Roller 49 guides cable 48 properly in either installation. The functioning of cable 48 and spring 53 is identical to that described in connection with the other embodiment, and it is likewise clear that the rider 45 may be associated with coupling member 4 in the modification of Figs. 14 to 17 in the manner previously referred to.

From the foregoing description, it will be apparent that I have provided a hitch which automatically disengages the tractor clutch upon an obstruction being encountered by the implement drawn, and which further acts as a dashpot to relieve the parts of shock and breaking strains. My improved device enables the hitch to be reengaged without inconvenience and danger once the tractor has been declutched by means conveniently available to the operator. The device is completely fool-proof and is characterized by features of safety which render it impossible to injure the implement in any manner. The only operations on the part of the operator which are necessary are to back up the tractor and lift the plow or other implement over the obstruction which has halted it, whereupon he may continue.

I have illustrated and described my improvements in embodiments which I have found very practical. I have not attempted to illustrate or describe other embodiments or adaptations as it is believed this disclosure will enable those skilled in the art to embody or adapt my improvements as may be desired.

Having thus described my invention, what I claim as new and desire to secure by Letters Patent, is:

1. In a hitch device, the combination of a draft rod provided with a draw bar coupling at its front end and with a draft lug, a hitch member slidable on said draft rod and comprising spaced front, rear and intermediate crossheads, the front and intermediate crossheads being in slidable engagement with the draft rod, the rear crosshead being provided with a coupling member, tie rods joining said front and rear crossheads and arranged extending through the intermediate crosshead, a dashpot cylinder arranged between the intermediate and rear crossheads, said draft rod being provided with a plunger coacting with said dashpot cylinder and provided with a check valve, a cylindrical housing arranged between said front and intermediate crossheads, a coiled draft spring arranged within said housing, an adjustable support member for said spring provided with supporting and adjusting screws on said front crosshead, a yoke disposed within the spring and provided with a thrust collar engaging the inner end of said spring, coupling pawls pivoted to said yoke and shouldered to engage said draft lug on said draft rod, springs acting to urge said coupling pawls to lug engaging position, a collar slidable on said draft rod at the rear of said draft lug, links connecting said collar to the swinging ends of said coupling pawls, a spring urging said collar forwardly, a stop rod on said intermediate crosshead limiting the forward movement of said collar, and a stop within said housing disposed at the rear of and normally out of engagement with said yoke thrust collar.

2. In a hitch device, the combination of a draft rod provided with a draw bar coupling at its front end and with a draft lug, a hitch member slidable on said draft rod and comprising spaced front, rear and intermediate crossheads, the front and intermediate crossheads being in slidable engagement with the draft rod, the rear crosshead being provided with a coupling member, tie rods joining said front and rear crossheads and arranged extending through the intermediate crosshead, a dashpot cylinder arranged between the intermediate and rear crossheads, said draft rod being provided with a plunger coacting with said dashpot cylinder and provided with a check valve, a cylindrical housing arranged between said front and intermediate crossheads, a coiled draft spring arranged within said housing, a yoke provided with a thrust member engaging the inner end of said spring, coupling pawls pivoted to said yoke and shouldered to engage said draft lug on said draft rod, springs acting to urge said coupling pawls to lug engaging position, a collar slidable on said draft rod at the rear of said draft lug, links connecting said collar to the swinging ends of said coupling pawls, a spring urging said collar forwardly, and a stop rod on said intermediate crosshead limiting the forward movement of said collar.

3. In a hitch device, the combination of a draft rod provided with a draw bar coupling at its front end and with a draft lug, a hitch member slidable on said draft rod and comprising spaced front, rear and intermediate crossheads, the front and intermediate crossheads being in slidable engagement with the draft rod, the rear crosshead being provided with a coupling member, tie rods joining said front and rear crossheads and arranged extending through the intermediate crosshead, a dashpot cylinder arranged between the intermediate and rear crossheads, said draft rod being provided with a plunger coacting with said dashpot cylinder and provided with a check valve, a cylindrical housing arranged between said front and intermediate crossheads, a coiled draft spring arranged within said housing, a yoke provided with a thrust member engaging the inner end of said spring, coupling pawls pivoted to said yoke and shouldered to engage said draft lug on said draft rod, springs acting to urge said coupling pawls to lug engaging position, friction members disposed between said springs and said draft rod, a collar slidable on said draft rod at the rear of said draft lug, links connecting said collar to the swinging ends of said coupling pawls, a spring urging said collar forwardly, and a stop rod on said intermediate crosshead limiting the forward movement of said collar.

4. In a hitch device, the combination of a draft rod provided with a draw bar coupling at its front end and with a draft lug, a hitch member slidable on said draft rod comprising spaced front, rear and intermediate crossheads, the front and intermediate crossheads being in slidable engagement with the draft rod, the rear crosshead being provided with a coupling member, a dashpot cylinder arranged between the intermediate and rear crossheads, said draft rod being provided with a plunger coacting with said dashpot cylinder and provided wtih a check valve, a cylinder housing arranged between said front and intermediate crossheads, a coiled draft spring arranged within said housing, an adjusting means for said spring, a thrust member engaging the inner end of said spring, coupling pawls pivoted to said thrust member to coact with said draft lug on said draft rod, springs acting to urge said coupling pawls to engaged position, a collar slidable on said draft rod at the rear of said draft lug, links connecting said collar to the swinging ends of said coupling pawls, a spring urging said collar forwardly, a stop on said intermediate crosshead limiting the forward movement of said collar, and a stop within said housing disposed at the rear of and normally out of engagement with said thrust member.

5. In a hitch device, the combination of a draft rod provided with a draw bar coupling at its front end and with a draft lug, a hitch member slidable on said draft rod comprising spaced front, rear and intermediate crossheads, the front and intermediate crossheads being in slidable engagement with the draft rod, the rear crosshead being provided with a coupling member, a dashpot cylinder arranged between the intermediate and rear crossheads, said draft rod being provided with a plunger coacting with said dashpot cylinder and provided with a check valve, a cylinder housing arranged between said front and intermediate crossheads, a coiled draft spring arranged within said housing, a thrust member engaging the inner end of said spring, coupling pawls pivoted to said thrust member to coact with said draft lug on said draft rod, springs acting to urge said coupling pawls to engaged position, a collar slidable on said draft rod at the rear of said draft lug, links connecting said collar to the swinging ends of said coupling pawls, a spring urging said collar forwardly, and a stop on said intermediate crosshead limiting the forward movement of said collar.

6. In a hitch device, the combination of a draft rod provided with a draw bar coupling at its front end and with a draft lug, a hitch member slidable on said draft rod, a coiled draft spring, a thrust member engaging the inner end of said spring, coupling pawls pivoted to said thrust member to coact with said draft lug on said draft rod, springs acting to urge said coupling pawls to engaged position, a collar slidable on said draft rod at the rear of said draft lug, links connecting said collar to the swinging ends of said coupling pawls, a spring urging said collar forwardly, and a stop limiting the forward movement of said collar.

7. In a tractor hitch, the combination of a draft rod provided with a draw bar coupling at its front end and with a draft lug, a hitch member slidable on said draft rod and comprising spaced front, rear and intermediate crossheads, the front and intermediate crossheads being in slidable engagement with the draft rod, the rear crosshead being provided with a coupling member, tie rods joining said front and rear crossheads and arranged extending through the intermediate crosshead, a dashpot cylinder arranged between the intermediate and rear crossheads, said draft rod being provided with a plunger coacting with said dashpot cylinder and provided with a check valve, a cylindrical housing arranged between said front and intermediate crossheads, a coiled draft spring arranged within said housing, an adjustable support member for said spring, a thrust member engaging the inner end of said spring, coupling pawls pivoted to said thrust member to coact with said draft lug on said draft rod, means acting to release said pawls on the compression of said spring beyond a predetermined point, and an internal stop within said housing disposed at the rear of and normally out of engagement with said thrust member.

8. In a tractor hitch, the combination of a draft rod provided with a draw bar coupling at its front end and with a draft lug, a hitch member slidable on said draft rod and comprising spaced front, rear and intermediate crossheads, the front and intermediate crossheads being in slidable engagement with the draft rod, the rear crosshead being provided with a coupling member, tie rods joining said front and rear crossheads and arranged extending through the intermediate crosshead, a dashpot cylinder arranged between the intermediate and rear crossheads, said draft rod being provided with a plunger coacting with said dashpot cylinder and provided with a check valve, a cylindrical housing arranged between said front and intermediate crossheads, a coiled draft spring arranged within said housing, a thrust member engaging the inner end of said spring, coupling pawls pivoted to said thrust member to coact with said draft lug on said draft rod, and means acting to release said pawls on the compression of said spring beyond a predetermined point.

9. In a tractor hitch, the combination of a draft rod provided with a draw bar coupling at its front end and with a draft lug, a hitch member slidable on said draft rod and comprising spaced front, rear and intermediate crossheads, the front and intermediate crossheads being in slidable engagement with the draft rod, the rear crosshead being provided with a coupling member, tie rods joining said front and rear crossheads and arranged extending through the intermediate crosshead, means mounted between the intermediate and rear crossheads for resisting sliding movement of said hitch member on said draft rod in one direction, a cylindrical housing arranged between said front and intermediate crossheads, a coiled draft spring, a thrust member engaging the inner end of said spring, coupling pawls pivoted to said thrust member to coact with said draft lug on said draft rod, and means acting to release said pawls on the compression of said spring beyond a predetermined point.

10. In a tractor hitch, the combination of a draft rod provided with a draw bar coupling at its front end and with a draft lug, a hitch member slidable on said draft rod, a coiled draft spring, a thrust member engaging the inner end of said spring and movable relative to said hitch member in opposition to the spring, a coupling pawl, means connecting said pawl with said thrust member to coact with said draft lug on said draft rod, and positively acting means to release said pawl from the draft lug on the compression of said spring beyond a predetermined point.

11. In a tractor hitch, the combination of a draft rod provided with a draw bar coupling at its front end and with a draft lug, a hitch member slidable on said draft rod, a coiled draft spring, a thrust member engaging the inner end of said spring, coupling pawls pivoted to said thrust member to coact with said draft lug on said draft rod, springs acting to urge said coupling pawls to lug engaging position, friction members disposed between said springs and said draft rod, and means acting to release said pawls on the compression of said spring beyond a predetermined point.

12. In a hitch device, the combination of a draft rod provided with a draw bar provided with a coupling at its front end and with a draft lug, a hitch member slidable on said draft rod comprising spaced front, rear and intermediate crossheads, the front and intermediate crossheads being in slidable engagement with the draft rod, the rear crosshead being provided with a coupling member, a dashpot cylinder arranged between the intermediate and rear crossheads, said draft rod being provided with a plunger coacting with said dashpot cylinder and provided with a check valve, a cylinder housing arranged between said front and intermediate crossheads, a coiled draft spring arranged within said housing, adjusting means for said spring, a thrust member engaging said spring, coupling pawls pivoted to said thrust member to coact with said draft lug on said draft rod, means acting to release said pawls on the compression of said spring beyond a predetermined point, and an internal stop within said housing disposed at the rear of and normally out of engagement with said thrust member.

13. In a hitch device, the combination of a draft rod provided with a draw bar provided with a coupling at its front end and with a draft lug, a hitch member slidable on said draft rod comprising spaced front, rear and intermediate crossheads, the front and intermediate crossheads being in slidable engagement with the draft rod, the rear crosshead being provided with a coupling member, a dashpot cylinder arranged between the intermediate and rear crossheads, said draft rod being provided with a plunger coacting with said dashpot cylinder and provided with a check valve, a cylinder housing arranged between said front and intermediate crossheads, a coiled draft spring arranged within said housing, a thrust member engaging said spring, coupling pawls pivoted to said thrust member to coact with said draft lug on said draft rod, and means acting to release said pawls on the compression of said spring beyond a predetermined point.

14. In a hitch device, the combination of a draft rod provided with a draw bar provided with a coupling at its front end and with a draft lug, a hitch member slidable on said draft rod, a coiled draft spring, a thrust member engaging said spring shiftable relative to said hitch member in opposition to said spring, coupling pawls pivoted to said thrust member to coact with said draft lug on said draft rod, and positively acting means to release said pawls on the compression of said spring beyond a predetermined point.

15. In a hitch device, the combination of a draft rod, a hitch member slidably associated therewith and comprising a housing, a dashpot cylinder operatively associated with said housing, said draft rod being provided with a plunger coacting with said dashpot cylinder, a draft spring within said housing, a spring engaging member, a coupling pawl mounted on said spring engaging member to coact with said draft rod, and means acting to release said pawl on the compression of the spring beyond a predetermined point.

16. In a hitch device, the combination of a draft rod, a hitch member slidably associated therewith and comprising a housing, a draft spring within said housing, a spring engaging member shiftably mounted relative to said hitch member, a coupling pawl mounted on said spring engaging member to coact with said draft rod, and positively acting means to release said pawl on the compression of the spring beyond a predetermined point.

17. In a hitch device, the combination of a draft rod, a hitch member slidably associated with said draft rod, a dashpot cylinder carried by said hitch member, said draft rod being provided with a plunger coacting with said dashpot, a draft spring, a coupling pawl detachably engageable with said draft rod, a carrier for said pawl engaging said spring and mounted for shifting movement relative to said hitch member in opposition to said spring, and means for releasing said pawl on the compression of the spring beyond a predetermined point.

18. In a hitch device, the combination of a draft rod, a hitch member slidably associated with said draft rod, a draft spring, a coupling pawl detachably engageable with said draft rod, a carrier for said pawl engaging said spring and mounted for movement relative to said hitch member, and positively acting means for releasing said pawl on the compression of the spring by said carrier beyond a predetermined point.

19. In a tractor hitch, an elongated draft rod connected to the draw bar of the tractor, means slidable relative to said draft rod and pivotally connected to a drawn implement, means for engaging said means with said draft rod for resiliently drawing said implement, means acting positively on said engaging means for disengaging said engaging means whereby to separate said tractor and implement, means for yieldingly opposing separating movement of said tractor and implement after disengagement, and means for automatically releasing the clutch of the tractor actuated by said separating movement, comprising a cable connecting said clutch and hitch and a roller over which said cable passes, and means for re-engaging said clutch.

20. A hitch for connecting a tractor with a drawn implement, comprising an elongated draft rod, a hitch member slidable relative to said draft rod, means for engaging said hitch member with said draft rod for resiliently drawing said implement, means for disengaging said engaging means whereby to separate the tractor and implement, means for yieldingly opposing separating movement of said tractor and implement after disengagement, means actuated by said separating movement for automatically releasing the clutch of the tractor, comprising a cable, an extension spring associated with said cable operatively connecting the hitch and clutch to yieldingly connect said clutch and hitch and a roller over which said cable passes, and means for re-engaging the clutch comprising a rider slidable on said draft rod, said cable being connected to said rider, and a detent releasably securing said rider to said hitch member.

21. A hitch for connecting a tractor with a drawn implement, comprising an elongated draft rod, a hitch member slidable relative to said draft rod, means for engaging said hitch member with said draft rod for resiliently drawing said implement, means for disengaging said engaging means whereby to separate the tractor and implement, means for yieldingly opposing separating movement of said tractor and implement after disengagement, means actuated by said separating movement for automatically releasing the clutch of the tractor, comprising a cable operatively connecting the hitch and clutch, an extension spring associated with said cable to yieldingly connect said clutch and hitch and a roller over which said cable passes, and means for re-engaging the clutch comprising a rider slidable on said draft rod, said cable being connected to said rider, and a detent releasably engaging said rider and in engaged relation therewith, preventing the rider from sliding on the draft rod and thus removing tension from said cable.

22. A hitch for connecting a tractor with a drawn implement, comprising an elongated draft rod, a hitch member slidable relative to said draft rod, means for engaging said hitch member with said draft rod for drawing said implement, means for disengaging said engaging means whereby to separate the tractor and implement, means for opposing separating movement of said tractor and implement after disengagement, means actuated by said separating movement for automatically releasing the clutch of the tractor, comprising a cable operatively connecting the hitch and clutch, and a roller over which said cable passes, and means for re-engaging the clutch comprising a rider slidable on said draft rod, said cable being connected to said rider, and means engaging said rider and in engaged relation therewith, preventing the rider from sliding on the draft rod and thus removing tension from said cable.

JUSTIN H. KORTERING.